US009788182B2

(12) United States Patent
Lee et al.

(10) Patent No.: US 9,788,182 B2
(45) Date of Patent: Oct. 10, 2017

(54) METHOD AND SYSTEM FOR PACKET COLLISION AVOIDANCE IN A WIRELESS COMMUNICATION SYSTEM

(71) Applicant: U.S. Army Research Laboratory, Washington, DC (US)

(72) Inventors: King F. Lee, Silver Spring, MD (US); Ronald G. Tobin, Burtonsville, MD (US); William A. Walsh, Mountain View, CA (US); Peter H. Lawrence, Tempe, AZ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 204 days.

(21) Appl. No.: 14/729,452

(22) Filed: Jun. 3, 2015

(65) Prior Publication Data
US 2017/0064580 A1    Mar. 2, 2017

(51) Int. Cl.
*H04W 4/22* (2009.01)
*H04W 74/08* (2009.01)

(52) U.S. Cl.
CPC ......... *H04W 4/22* (2013.01); *H04W 74/0816* (2013.01)

(58) Field of Classification Search
CPC ..... H04L 41/0672; H04L 5/0044; H04L 1/16; H04L 1/20; H04L 47/13; H04L 49/352; H04L 1/08

See application file for complete search history.

(56) References Cited

U.S. PATENT DOCUMENTS

| 5,517,504 A | 5/1996 | Tran et al. |
| 5,661,727 A * | 8/1997 | Kermani ............... H04W 48/18 348/423.1 |
| 6,765,882 B2 | 7/2004 | Rittle et al. |

(Continued)

OTHER PUBLICATIONS

Karn, P., "MACA 1 • A New Channel Access Method for Packet Radio," American Radio Relay League.www.arrl.org/files/.../NetCon9-Karn.pdf.

(Continued)

*Primary Examiner* — Charles C Jiang
*Assistant Examiner* — Saad Khawar
(74) *Attorney, Agent, or Firm* — Lawrence E. Anderson

(57) ABSTRACT

A system for wireless communication comprising a plurality of wireless stations; each station configured to receive and transmit communications on at least one channel, each station comprising at least one processor and at least one memory operatively connected to the at least one processor; the at least one processor being configured to sense communications on the at least one channel and to wait a predetermined number of units of delay before transmitting a communication on the channel; the predetermined number of units of delay before transmission of the next communication being operatively associated with communications by the respective units. A method for controlling access in a wireless communication system comprising providing a wireless network comprising a plurality of communication units configured to transmit and/or receive communications over a channel; each communication unit being operatively associated with a delay counter and a memory containing reservations for a communication unit to transmit.

20 Claims, 5 Drawing Sheets

(56) References Cited

U.S. PATENT DOCUMENTS

| | | |
|---|---|---|
| 8,027,273 B2 | 9/2011 | Nguyen |
| 2007/0116033 A1 | 5/2007 | Reunamaki et al. |
| 2007/0293218 A1 | 12/2007 | Meylan et al. |
| 2009/0141738 A1* | 6/2009 | Li .................... H04L 12/413 370/448 |
| 2009/0196273 A1 | 8/2009 | Kwon et al. |
| 2012/0076146 A1* | 3/2012 | Rohatschek .......... H04L 12/422 370/392 |
| 2014/0153514 A1* | 6/2014 | Nezou ............... H04W 74/0816 370/329 |
| 2016/0044693 A1* | 2/2016 | Sun ....................... H04W 72/10 370/336 |
| 2016/0359572 A1* | 12/2016 | Zhou ................ H04W 74/0816 |

OTHER PUBLICATIONS

Karn, P., "MACA: A New Channel Access Method for Packet Radio," The proceedings of the 9th ARRL Computer Networking Conference, London, Ontario, Canada, 1990.

Mergen, G. "Random Scheduling Medium Access for Wireless Ad Hoc Networks," Institute of Electrical and Electronics Engineers, MILCOM 2002. Proceedings Oct. 7-10, 2002 (vol. 2 ) .10.1109/MILCOM.2002.1179588.

Bharghavan, V. MACAW: A Media Access Protocol for Wireless LAN's, Department of Electrical Engineering and Computer Science, Univ. of Calif. at Berkeley, Association of Computing Machinery pp. 212-225, 1994.

L. Kleinrock and F. Tobagi, "Packet switching in radio channels: Part I—Carrier sense multiple access modes and their throughput delay characteristics," IEEE Trans. Commun. , vol. COM-23, No. 12, pp. 1400-1416, Dec. 1975.

F. Tobagi and L. Kleinrock, "Packet switching in radio channels: Part II—The hidden terminal problem in carrier sense multiple-access and the busy-tone solution," IEEE Trans. Commun., vol. COM-23, No. 12, pp. 1417-1433, Dec. 1975.

S. S. Lam, "Packet broadcast networks—A performance analysis of the R-ALOHA protocol," IEEE Trans. Comput., vol. C-29, No. 7, pp. 596-603, Jul. 1980.

Crowther, W., "A system for Broadcast Communication: Reservation-ALOHA," Proc. 6th Hawaii Int. Conf. Syst Sci Jan. 1973, pp. 371-374.

* cited by examiner

FIG. 1    Collision Avoidance System Diagram

*Determining a New Reservation*

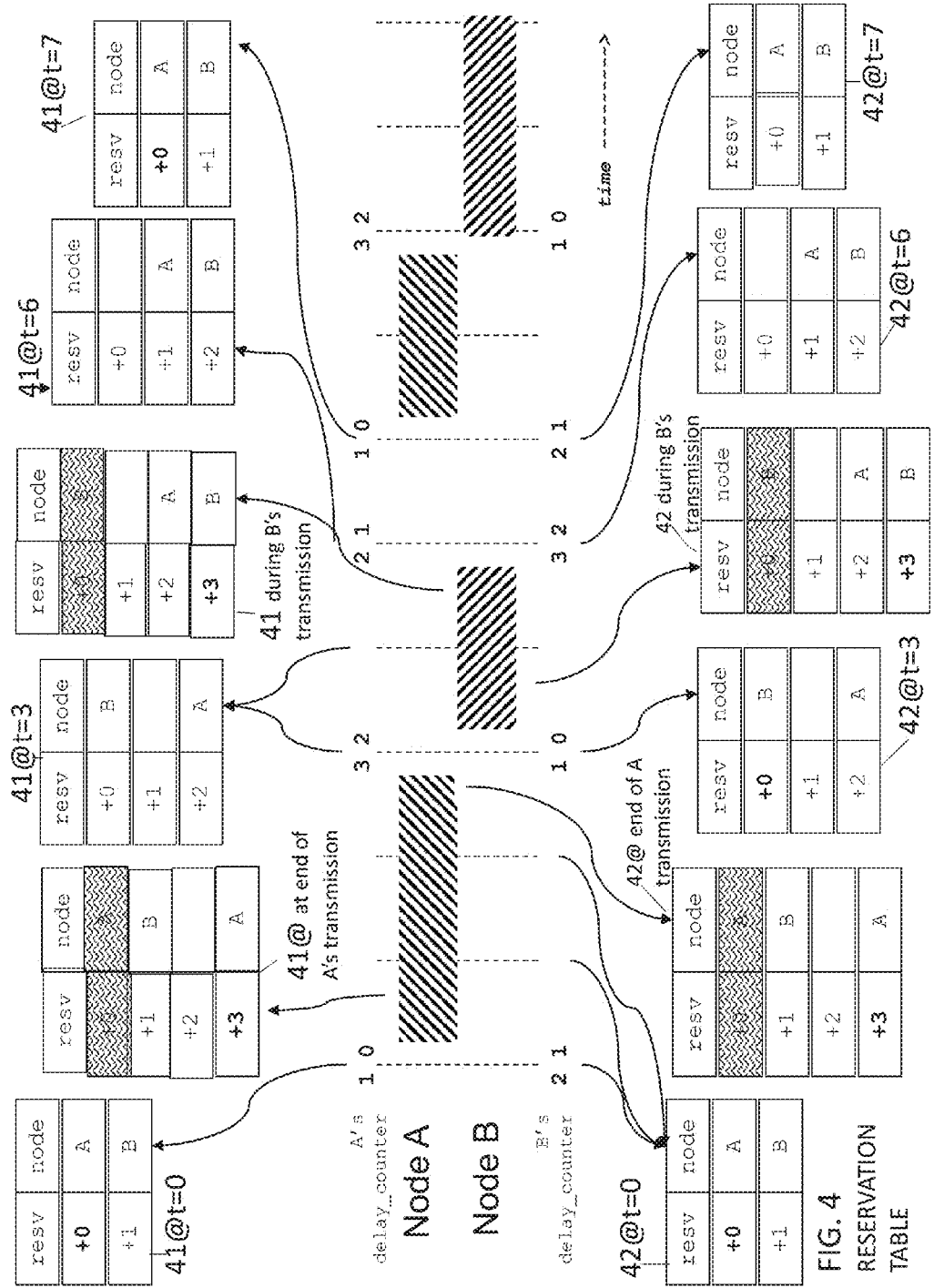
FIG. 4 RESERVATION TABLE

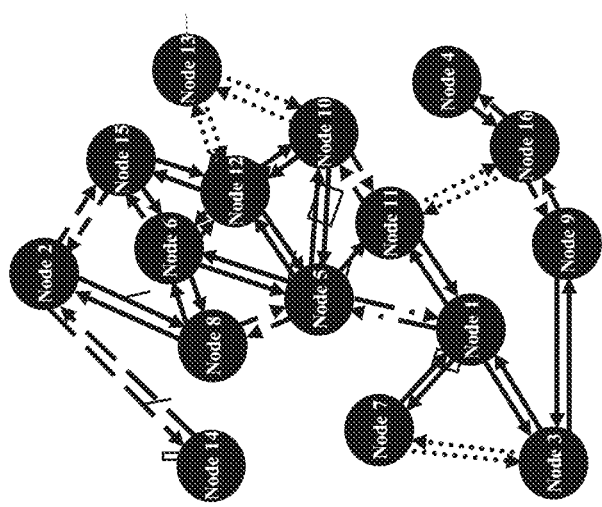
FIG. 5 Mobile Ad Hoc network

METHOD AND SYSTEM FOR PACKET COLLISION AVOIDANCE IN A WIRELESS COMMUNICATION SYSTEM

STATEMENT OF GOVERNMENT INTEREST

The invention described herein may be manufactured, used, and licensed by or for the United States Government without the payment of royalties.

BACKGROUND OF THE INVENTION

This invention relates broadly to wireless communication systems and in particular, to carrier sense multiple access (CSMA), delay transmission, and reservations. Carrier Sense Multiple Access is a method for usage and control of a shared medium used in communications. Briefly, the method entails a carrier sensing scheme in which a unit that desires to transmit first senses if there is another unit currently transmitting before initiating a transmission. However, collisions may still occur if two units are sensing at approximately the same time and make a decision that the medium is free. Consequently, a collision may occur if both units transmit at the same time.

SUMMARY OF THE INVENTION

The present invention is directed to a method for controlling access in a wireless communication system comprising:

providing a wireless network having a plurality of communication units configured to transmit and/or receive communications over a shared medium or channel; each communication unit being operatively associated with a delay counter and a memory; the memory containing reservations for other communication units to transmit on the channel;

determining whether or not the channel is available; if a communication is being transmitted on the channel determining whether a reservation accompanies the communication and, if so, storing the reservation in the memory; if the channel is available, determining whether or not the delay counter has reached the predetermined time for transmission; if the predetermined time has not arrived, decrementing the delay counter, decrementing the reservations in the memory, and determining again whether or not the channel is available;

if the predetermined time has arrived, transmitting the communication on the channel accompanied by a predetermined number as a reservation indicating the amount of delay before the next transmission by the unit sending the communication.

Optionally the predetermined number may be a pseudorandom and the predetermined number is the units of delay that are counted beginning when the channel becomes available. A unit of delay may approximate the time a communication unit takes to sense the presence of a transmission on the channel. When making a reservation, each unit has equal opportunity for access to the channel.

Optionally, the memory may comprise a reservation table.

The present invention is also directed to an alternative method for providing collision avoidance of packets of transmitted data in a wireless communication system, comprising the steps of:

determining, by an individual unit during a predetermined time interval, whether another unit is transmitting, and, where the channel is idle, waiting a predetermined number of units of delay before transmitting a packet to at least one other unit; and waiting, by each of a plurality of other units, for a predetermined length of time between transmission of consecutive packets on a channel to allow transmission of a packet from another unit on the channel and reading a memory containing reserved units of delay for each unit to transmit prior to transmission of a packet on the channel.

Optionally, the wireless communication system is a radio system and each radio communication is accompanied by a predetermined number indicating the amount of delay before the next transmission by the unit sending the communication. Optionally, the predetermined number is pseudorandom and the predetermined number is the units of delay that are counted beginning when the channel becomes available. Each unit may operate autonomously with respect to transmissions and the first unit of delay may be reserved for an emergency communication.

The present invention is also directed to a preferred embodiment system for wireless communication comprising a plurality of wireless stations; each station configured to receive and transmit communications on at least one channel, each station comprising at least one processor and at least one memory operatively connected to the at least one processor; the at least one processor being configured to sense communications on the at least one channel and to wait a predetermined number of units of delay before transmitting a communication on the channel; the predetermined number of units of delay before transmission of the next communication being operatively associated with communications by the respective units.

Optionally, the at least one memory comprises a list of transmission delay times for each station having communications to transmit. Alternatively, the at least one memory comprises a list of reservations specifying the units of delay a station will wait after clearance of the at least one channel, and the at least one processor operates to avoid collisions by determining transmission times which are not in conflict with the reservation of another station. The at least one processor may be configured to sense when a communication transmitted collides with a communication of another station and to retransmit after a predetermined number of units of delay. The predetermined number of units of delay may be pseudorandom. The at least one processor may be configured to detect periods when the at least one channel is idle and to transmit communications during idle periods after waiting a predetermined number of units of delay. The unit of delay may approximate the time required to sense the presence of a communication on the at least one channel. The wireless communication system may be a radio communication system that is a carrier sense multiple access communication system with collision avoidance.

In the alternative, the communications may be transmitted in packets with each packet carrying a flag to indicate if that particular packet is being transmitted at a previously reserved units of delay time. Using this feature, the at least one processor checks the flag to determine if the flag indicates the packet is transmitted using a prior reserved reservation and checks the at least one memory to confirm that that particular reservation was reserved by the particular station, and if both conditions are not met, a hidden station is detected and the algorithm of selecting the predetermined number of units of delay is modified to accommodate the hidden station.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 4 is an illustration schematically depicting an example of a preferred embodiment system operation. The example in FIG. 4 shows the reservation tables 41 and 42, of A and B respectively, and shows A's delay counter and B's delay counter started at 1 and 2 units respectively.

FIG. 5 is a schematic illustration of a mobile network showing various interconnected nodes.

Figure 1:
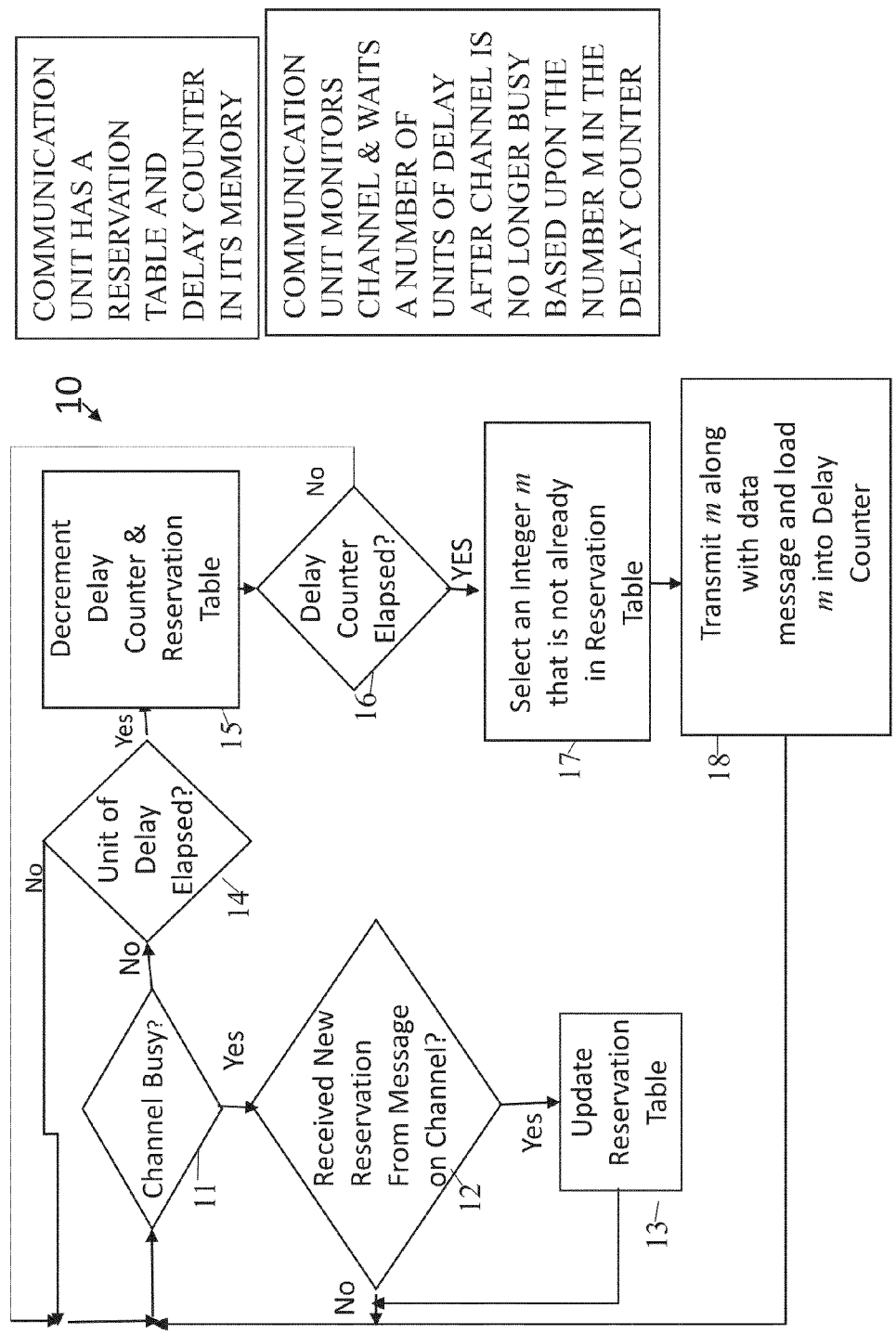
FIG. 1 is an illustration of a block diagram/flow chart of the preferred method for message transmission.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. For example, when referring first and second units, these terms are only used to distinguish one unit from another unit. Thus, a first unit, element, component, region, layer or section discussed below could be termed a second unit, element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An aspect of the present invention is a preferred method to enhance the dynamic performance of ad-hoc wireless communication systems by eliminating packet collisions and improving channel utilization. A transceiver (or communication unit) in the preferred embodiment wireless communication system announces to other transceivers (or communication units) the number of units of delay the transceiver intends to wait before transmitting its next message when the common medium becomes free, and it conversely uses already received announcements from the other transceivers to keep track of future transmissions of the other transceivers (or communication units) and optimally select units of delay for its next transmission to avoid colliding with the other transceivers, optimize throughput and latency, and prioritize traffic for quality of service control.

By informing each other just a simple piece of information, i.e., number of units of delay, transceivers in a wireless communication system can dynamically self-organize their transmissions to avoid collisions, optimize system performance, and achieve near perfect channel utilization with generally a single byte or less transmission overhead.

The present invention relates to carrier sense multiple access (CSMA), delay transmission, and reservations. A preferred embodiment of the present invention employs elements of these and other ideas in a novel, resource efficient, and easy to implement way to achieve collision avoidance and improve various communication system performance measures. Use of carrier detection time (time in which it takes to determine whether or not another transceiver is utilizing the channel) as the fundamental unit of delay provides the best fine-grained control that allows for improving channel efficiency and minimizing latency. Use of reservation and dynamic selection of units of delay allows the transceivers (communication units) to dynamically self-organize to avoid collisions and optimize channel utilization. The preferred embodiment technique does not require any regular periodic transmissions to maintain timing synchronization as in existing systems. The channel is reserved as needed in a very fine-grained manner instead of allocated therefore avoids potential wasted allocation/resource as in conventional TDMA or slotted ALOHA systems. In accordance with a preferred embodiment of the invention, during each transmission, a transceiver (communication unit) announces to its neighbors how many units of delay (carrier detection time) it intends to wait before transmitting the next message when the communication medium/channel becomes free. The neighboring transceivers (communication units) upon receiving the announcement/reservation from said transceiver would use that information to schedule their own future transmissions and in turn announce their intentions to the others so that the counts of units of delay are maintained among all transceivers and collisions can be avoided. Also the preferred embodiment system dynamically adjusts the strategy on the number of units of delay selection according to the state of the system and application specific requirements to optimize the operation of the system. The preferred embodiment system may employ carrier detection time as the unit of delay to spread out transmissions among transceivers in the system. One aspect of the preferred embodiment system is to reduce the range of the number for units of delay after collisions have been avoided to facilitate significantly system throughput and latency improvement.

Another aspect of the present invention relates to the adjusting of the range of the number generator as a function of the number of active transceivers (communication units) to control the probability/possibility of a collision. The number generator may be, but is not limited to, a random number generator. The preferred embodiment system utilizes a number of approaches on optimally selecting pseudorandom numbers and non-random numbers for the units of delay. The preferred embodiment system maintains proper counts on the units of delay among all transceivers in the network so that transmission collisions can be avoided.

The present invention relates generally to medium access control in wireless communication systems and more specifically to medium access control for collision avoidance in a wireless communication system, which may be ad-hoc. The present invention is applicable to carrier sense multiple access (CSMA) communication systems where a transceiver (communication unit) would first try to sense the presence of carrier signal from other transceivers (communication units) and may only transmit after determining the common medium is free, i.e., no detectable carrier signal from other transceivers. Even with CSMA, collisions can still occur if the transceivers (communication units) are set to transmit as soon as the medium is detected to be free because multiple transceivers may detect that the medium is free at the same time and start to transmit simultaneously thus causing collisions. Collisions and the subsequent retransmissions are especially costly to energy constrained systems such as battery operated wireless sensor networks. Therefore collision avoidance techniques are of significant interest to energy constrained wireless communication systems The preferred embodiment of the present invention allows a wireless communication system, which may or may not be ad-hoc, to improve throughput, lower the average packet latency and increase energy efficiency by reducing or eliminating collisions. A preferred embodiment of the present invention is described as follows.

Transceivers in the wireless communication system delay the start of transmission by some length of time instead of start transmitting immediately upon determining the common medium is free. Collisions may be avoided when each transceiver (communication unit) in the system defers its start of transmission by a sufficient and different length of time. In a preferred embodiment of the present invention, each transceiver (communication unit) in the system defers its start of transmission by a different number of units of delay. A unit of delay is preferably defined as the length of time that the transceiver can reliably determine if the common medium is free, i.e., no carrier signal is detected. Delay in transmission induces channel idle time and negatively impact the throughput and latency of the system. Therefore, setting the unit of delay to carrier signal detection time provides the best fine-grained control that would allow the potential of minimizing idle time.

In accordance with an alternate preferred embodiment, the number of units of delay for the transceivers may be assigned by a central access manager in a structured system to ensure unique assignment for every transceiver within the system. In an ad-hoc wireless communication system, the preferred embodiment of the present invention is to have each transceiver (communication unit) pick its own number of units of delay in ways to minimize the chance of collisions.

For example, each transceiver (communication unit) may use a pseudorandom number generator to pick a number of units of delay for each transmission. The probability of collision, i.e., multiple transceivers pick the same number of units of delay, may be bounded by $$P_C \le 1 - \frac{R!}{(R-N)!R^N}$$

where N is the number of active transceivers and R is the range of the pseudorandom number.

In a preferred embodiment of the present invention, each transceiver (communication unit) uses a counter to control the defer transmission function. The counter is loaded with the number m and decremented at every unit of delay time instant when the common medium is deemed to be free. If the common medium is deemed busy, the decrement of the counter is suspended and to be resumed when the common medium is deemed to be free again. As the counter reaches a count of zero, the transceiver would have deferred its transmission by a total of m units of delay and can start to transmit.

To further reduce and eliminate all collisions, each transceiver would pick another number of units of delay that it will employ for its next transmission and include in the current transmission information on the number of units of delay that it intends to employ for its next transmission. That information, preferably an integer number representing the number of units of delay for the next transmission, is hereafter referred to as a reservation. By intelligently choosing the number of units of delay for the next transmission and informing each other via reservations, transceivers (communication units) in the ad-hoc wireless communication system can coordinate among themselves to avoid future collisions.

In a preferred embodiment of the present invention, each transceiver (communication unit) maintains a Reservation Table to keep track of all the reservations received from neighboring transceivers and to update/decrement the values of the reservations at every unit of delay time instant when the common medium is deemed to be free. It should be obvious to a person of ordinary skill in the art that by looking at the Reservation Table, a transceiver can predict when its neighboring transceivers will transmit their next message and be able to use that knowledge to pick a number of units of delay to reserve its own next transmission that will not coincide with any of the entry in the Reservation Table and be able to avoid collisions in future transmissions.

In a preferred embodiment of the present invention, a transceiver picks a number of units of delay for its next transmission that does not coincide with any of the entry in the Reservation Table and transmits an integer number representing the number of units of delay in a part of each message to serve as a reservation for its next transmission.

A transceiver may employ a number of strategies to pick the number of units of delay for its next transmission as long as it does not coincide with any of the existing unexpired reservations in the Reservation Table. in a preferred embodiment of the present invention, a transceiver I. picks a pseudorandom number of units delay within a range of R that is not already reserved by other transceivers in. the Reservation Table and where the range R is
     i. a function of the number of active transceivers N,
     ii. or a function of quality of service parameter Q,
     iii. or a function of an estimate on the presence of hidden terminals H,
     iv. or a combination of N, Q and H
  II. or picks the smallest number of units of delay that is not already reserved by other transceivers in the Reservation Table,
  III. or picks a number of units of delay that is larger than all the entries in the Reservation Table,
  IV. or picks a number of units of delay that is between the smallest number of units of delay that is not already reserved by other transceivers in the Reservation Table or larger than all the entries in the Reservation Table as
     i. a function of the number of active transceivers N,
     ii. or a function of quality of service parameter Q,
     iii. or a function of an estimate on the presence of hidden terminals H,
     iv. or a combination of N, Q and H.

In a preferred embodiment of the present invention, a transceiver (communication unit) initially picks a pseudorandom number of units delay within a range of R that is not already reserved by other transceivers in the Reservation Table and the range R is sufficiently large to limit the initial probability of collision. The transceiver then dynamically changes how to pick the number of units delay as the Reservation Table is filled up with reservations by the following methods:

I. successively reduce the range R to the number of active transceivers N or N plus an integer,
  II. or successively reduce the range R as a function. of the number of active transceivers N and an estimate on the presence of hidden terminals H,
  III. or pick the smallest number of units of delay that is not already reserved by other transceivers in the Reservation Table,
  IV. or as a function of the smallest number of units of delay that is not already reserved by other transceivers in the Reservation Table and an estimate on the presence of hidden terminals H.

Referring to FIG. 1, a block diagram/flow chart of the system algorithm is illustrated. In box 11, a transceiver determines whether or not the channel is busy. If the answer is yes, the program proceeds to box 12 to determine if a new reservation was received from the channel. If the answer is yes, the program proceeds to box 13 wherein the reservation table is updated. If the answer to Box 11 is that the channel is not busy, the program enters box 14.

In box 14, the program determines if a unit of delay has elapsed after the channel is no longer busy. If a unit of delay hasn't elapsed, radio transceiver has to continue to check if the channel is busy or not until a unit of delay has elapsed. If a unit of delay has elapsed, the Radio transceiver then proceeds to box 15. In the box 15 "Decrement Delay Counter and Reservation Table" both the delay counter and the entries in the reservation table are decremented at the same time.

In box 16, a determination is made as to whether or not the delay counter has lapsed. If no, the program returns to box 11. If yes, the program proceeds to box 17 where an integer m that is not already in the reservation table is selected to accompany the message to be transmitted next. In Box 18, the integer m is transmitted along with the data message and the integer m is also loaded into the delay counter.

Figure 2:
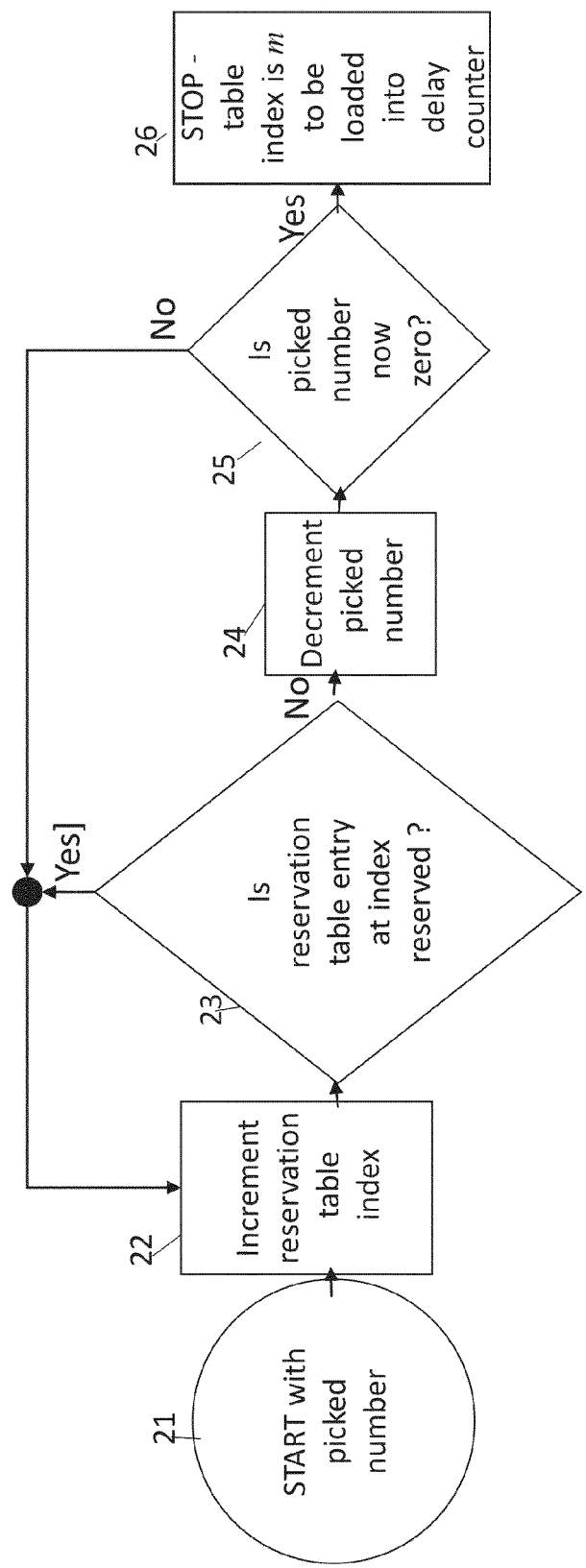
FIG. 2 is an illustration of the procedure for making a reservation including selecting a delay counter delay value.

Referring now to FIG. 2, a new reservation is made using the procedure outlined. The procedure starts with a picked number "n" which may be from a pseudorandom number generator or other means. The key criteria to avoiding a collision with the communication from another communication unit is reserving a number representing "units of delay" that is not already reserved by other communication units (e.g., radios). Therefore, it is necessary to check the reservation table to select an entry that has not already been reserved. Although there are many ways to accomplish this task, FIG. 2 is one example of a preferred procedure for scheduling a delay counter value. In box 21, The "START with picked number" is a call to pick a number which returns an integer n to be used as an intermediate variable to help set the delay counter and reservation. The index is another variable (referred to as "m") used to index or point to entries in the reservation table. Incrementing the index (box 22) simply traverses the reservation table. Incrementing the reservation table index (m) and checking if the table entry is reserved or not in box 22 and box 23 basically checks which "units of delay" in the reservation table have not been reserved; i.e., are available, at which point "n" is decremented. Note that every time "n" is decremented, the index to the reservation table is pointing to a "units of delay" that is not already reserved by any communication unit and is therefore available. Box 23 checks if a particular reservation table entry has been reserved. At box 24, the picked number n is decremented. At box 25, the decremented picked number is tested as to whether or not it is equal to zero. At this point the index to the reservation table is pointing to the nth available "units of delay." At box 26 labeled "STOP—table index is m to be loaded into delay counter," the value of the variable index is loaded into the delay counter, i.e., the integer "m" is loaded into the delay counter referenced in FIG. 1. In other words, the picked number "n" is converted to "m," which is the nth available "units of delay" guaranteed not to have already been reserved by the other communication units. Determining the reservation number (m) and scheduling the delay counter function together implements the Box 17 "Select an Integer m that is not already in Reservation Table" and "load m into Delay Counter" (Box 18) part of FIG. 1.

Figure 3:
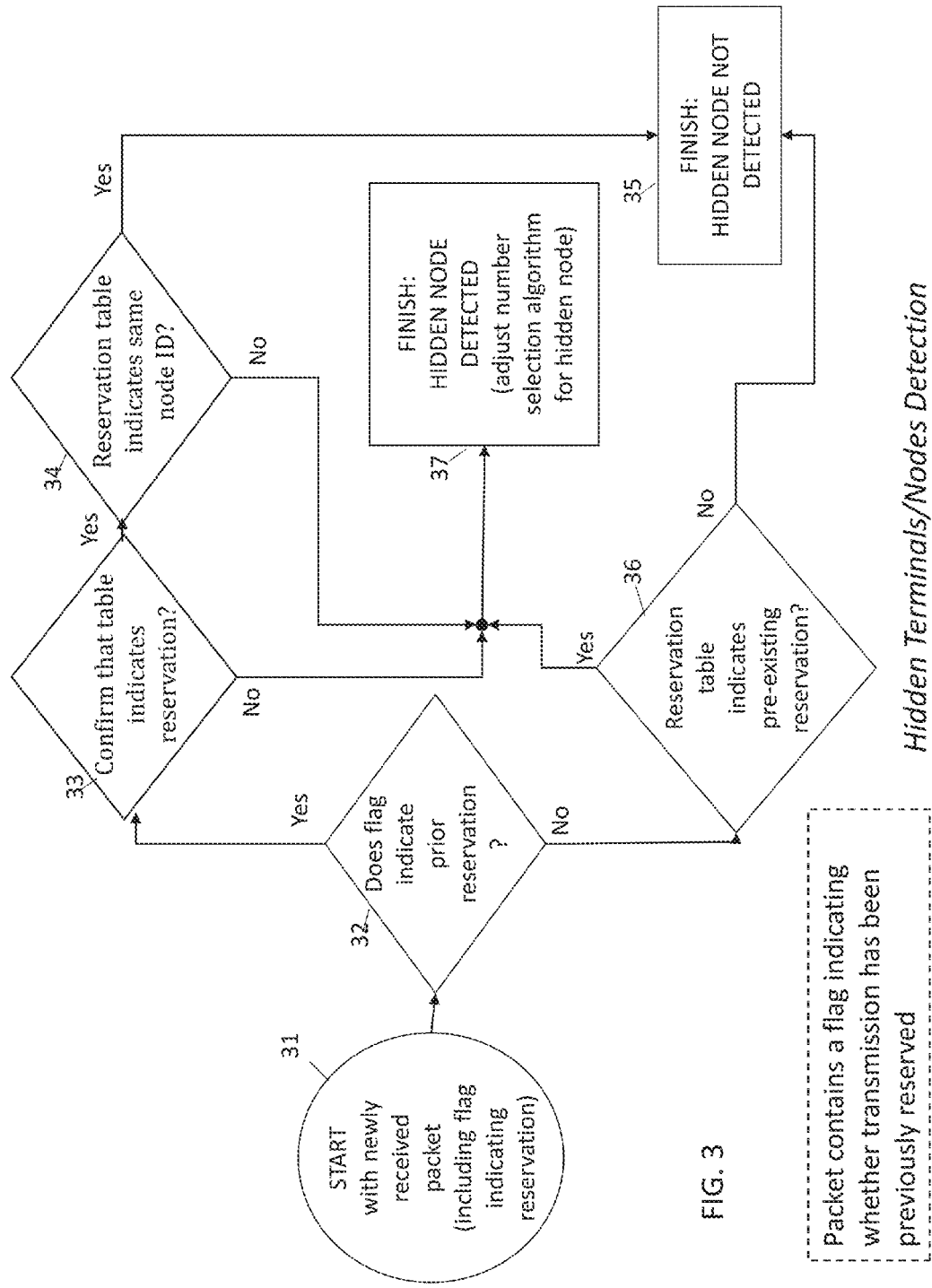
FIG. 3 illustrates schematically one method of detecting the presence of hidden node(s).

FIG. 3 illustrates schematically one method of detecting the presence of hidden node(s). Every packet carries a flag to indicate if that particular packet is being transmitted at a previously reserved delay time. The "prior reserve claimed?" box 32, checks that flag. If that flag indicates the packet is transmitted using a prior reserved reservation, i.e., the upper branch of FIG. 3, the receiver further checks its local reservation table to confirm that that particular reservation was reserved ("table indicates reservation ?" box 33) and by the particular transmitter ("table indicates same node ID?" box 34). If both conditions are met, everything is in proper order and the receiver assumes no hidden node is present and proceeds to box 35 "FINISH: HIDDEN NODE NOT DETECTED". If either condition is not met, the receiver assumes hidden node(s) may be present and proceeds to box 37 "FINISH: HIDDEN NODE DETECTED."

If the "prior reserve claimed?" (box 32) indicates the packet is not transmitted using a prior reserved reservation and the reservation table (box 36) indicates no one has reserved that particular spot, then everything is again in proper order and the receiver can assume no hidden node and proceed to box 35 "FINISH: HIDDEN NODE NOT DETECTED." However if the check of the reservation table indicates otherwise (box 36 "table indicates pre-existing reservation?" YES), the receiver would assume the presence of hidden node and proceeds to box 37 "FINISH: HIDDEN NODE DETECTED." When hidden node (Box 37) is detected, the algorithm of picking the reservation number may change how the integer is selected to accommodate the presence of hidden node.

When two nodes transmit at the same time and then if they retransmit at the same time again, they may try to retransmit again or just drop that particular message after a number of failed attempts. If the probability of a single collision is p, the probability of colliding twice would be p^2 and three times would be p^3, etc. If the nodes give up after 3 retransmissions, the probability of dropping a message is p^4. That probability can be quite low if p is kept reasonably small say less than 0.25.

FIG. 4 is an example of the operation of a preferred embodiment system. The values in the A's delay counter and B's delay counter were chosen somewhat arbitrarily just to illustrate the operation of the system over time. Small numbers were used to make the counting fit within the page. The example in FIG. 4 shows the reservation tables 41 and 42, of A and B respectively, and shows A's delay counter and B's delay counter started at 1 and 2 respectively. As A's delay counter reached 0, node A selected 3 which was not already in A's reservation table 41 for its next transmission. Node A transmitted reservation (3) along with a data message and loaded 3 into its delay counter. Node B received the reservation (3) from node A and loaded it into B's reservation table 42. After A's transmission, A's delay counter and B's delay counter continued counting down from 3 and 1 respectively. As B's delay counter reached 0, node B selected 3 which was not already in B's reservation table 41 for its next transmission. Node B transmitted reservation (3) along with data message and loaded 3 into its delay counter. Node A received the reservation (3) from node B and loaded it into A's reservation table 42. After B's transmission, A's delay counter and B's delay counter continued counting down from 2 and 3 respectively until one of the delay counters reached 0 and so on. The reservation tables 41 and 42 are shown at intervals over the course of the transmission of four messages between A and B.

Generally speaking, the present invention uses carrier detection time as the fundament unit of delay which provides the best fine-grained control that allows for improving channel efficiency and minimizing latency then traditional slotted based system. Use of reservation and dynamic selection of units of delay allows the transceivers to dynamically self-organize to avoid collisions and achieve near perfect channel utilization. The preferred embodiment technique does not require any regular periodic transmissions to maintain, timing synchronization as in existing systems therefore is very energy efficient and stealthy. Channel resource is reserved as needed in a very fine-grained manner instead of allocated, therefore avoids potential wasted allocation/resource as in conventional TDMA or slotted ALOHA system.

The present invention is designed to avoid transmission collisions in energy constrained tactical ad-hoc wireless communication systems to improve performance by eliminating the energy and channel resource expenditure associated with retransmission. The present. invention is highly effective, easy to implement, able to achieve near perfect channel utilization, and requires very low transmission overhead.

The present invention may be used for tactical wireless sensor network application to provide high performance communication capability while being extremely energy efficient and stealthy. The present invention is also applicable to other energy constrained military and commercial wireless communication systems such as: low power wireless sensor networks for environmental sensing, healthcare, safety, and security monitoring; in-vehicle ad-hoc wireless networks for telemetry and entertainment; battery powered wireless smart devices at home; etc.

Features of the present invention include: a) use of carrier detection time as the fundament unit of delay which provides the best fine-grained control that allows near perfect channel utilization; b) use of carrier detection time as the unit of delay for reservation allows effective and efficient collision avoidance; dynamic adjustment of number of units of delay selection allows optimization of collision avoidance for various network states and applications; and/or d) use of units of delay reservation and means to maintain the counts of units of delay among all the transceivers in the system during periods of channel activity and inactivity allows for efficient use of channel resource and effective collision avoidance.

The present invention has broad potential in the commercial space because of its high energy and bandwidth efficiency and low cost of implementation. Potential markets include: low power wireless sensor networks for environmental sensing, healthcare, safety, and security monitoring; in-vehicle ad-hoc wireless networks for telemetry and entertainment; battery powered wireless smart devices at home; etc.

As used herein the terminology "reservation table" means an electronic listing providing an arrangement made in advance for a communication unit or units to transmit at a predetermined time or after a predetermined number of units of delay when the channel is not busy.

As used herein, the terminology "timer" means an apparatus or system for determining elapsed time including but not limited to a delay counter.

As used herein, the terminology or "pseudorandom numbers" means a series or sequence of numbers whose properties approximate the properties of a sequence of random numbers. As used herein the pseudorandom number may be produced by a pseudorandom number generator or a random bit generator, or any other algorithm for generating a sequence of pseudorandom numbers.

As used herein, the terminology "autonomously" or "autonomous" means not being under the control of another unit.

As used herein, the terminology "ad hoc" means formed, arranged, or done for a particular purpose only.

As used herein, the terminology "approximately" or "approximate" means something is almost, but not completely, accurate or exact; roughly, that is between plus or minus 10% of the value determined.

As used herein, the terminology "carrier sense multiple access communication system with collision avoidance" (CSMA/CA) means a network multiple access method utilizing carrier sensing in which nodes or stations endeavor to avoid collisions by transmitting when the channel is sensed to be idle. When transmission occurs, the stations or nodes generally transmit their packet data altogether, as opposed to being divided into time slots or frames.

As used herein, the terms "transceiver," "unit," "communication unit," "station," and "node" are used interchangeably.

As used herein, the terminology "first available basis" means that the units are given access on a first-come-first-serve basis as the system becomes available.

Obviously, many modifications and variations of the present invention are possible in light of the above teachings. It is therefore to be understood that, within the scope of the appended claims, the invention many be practiced otherwise than as specifically described.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method for controlling access in a wireless communication system comprising: providing a wireless network comprising a plurality of communication units configured to transmit and/or receive communications in packets over a channel; each communication unit being operatively associated with a delay counter, at least one processor, and at least one memory; the at least one memory containing reservations for a communication unit to transmit on the channel;
determining whether or not the channel is available; if a communication is being transmitted on the channel, determining whether a reservation accompanies the communication and, if so, storing the reservation in the memory; if the channel is available, determining whether or not the delay counter has reached the predetermined time for transmission; if the delay counter has not reached the predetermined time, decrementing the delay counter, decrementing the reservations in the memory and determining again whether or not the channel is available; and
if the predetermined time has arrived, transmitting the communication on the channel accompanied by a predetermined number of units of delay selected by an algorithm indicating the amount of delay before the next transmission by the unit sending the communication; and wherein the algorithm comprises a random number generator for determining transmission delay times; a range of the random number generator being a function of a number of actively transmitting communication units and a probability of a collision.

2. The method of claim 1 wherein a predetermined number accompanies each message and wherein prior to sending the message the predetermined number is checked to determine whether or not it is in conflict with the reservations in memory, and wherein the predetermined number is determined by a random number generator having a range based upon probability of a collision Pc where $$Pc \leq 1 - \frac{R!}{(R-N)!R^N}$$

where N is the number of actively transmitting communication units and R is the range of the pseudorandom number generator; and the predetermined number is the units of delay that are counted beginning when the channel becomes available.

3. The method of claim 1 wherein a unit of delay approximates the time a communication unit takes to sense the presence of a transmission on the channel and wherein the range of the random number generator is adjusted based upon the number of actively transmitting communication units, the probability of a collision, a quality of communication reception desired, and an estimate of presence of hidden terminals.

4. The method of claim 1 wherein the at least one memory comprises a reservation table and wherein each communication unit comprises a transmitter for transmitting communications and a receiver for receiving communications or a transceiver for transmitting and receiving communications.

5. A method for providing collision avoidance of packets of transmitted data in a wireless communication system, comprising the steps of:
determining, by an individual unit during a predetermined time interval, whether another unit is transmitting, and where the channel is idle, waiting a predetermined number of units of delay before transmitting a packet to at least one other unit; and
waiting, by each of a plurality of other units, for a predetermined length of time between transmission of consecutive packets on a channel to allow transmission of a packet from another unit on the channel and reading at least one memory containing a reserved units of delay for each unit to wait prior to transmission of a packet on the channel;
receiving packets; each packet carrying a flag to indicate if that particular packet is being transmitted at a previously reserved units of delay time;
checking the flag to determine if the flag indicates the packet is transmitted using a prior reserved reservation and checking the at least one memory to confirm that that particular reservation was reserved by the particular station;
wherein if both conditions are not met, a hidden station is detected and the algorithm for selecting the predetermined number of units of delay is modified to accommodate the hidden station.

6. The method of claim 5 wherein the wireless communication system is a radio system and wherein each radio communication is accompanied by a predetermined number indicating the amount of delay before the next transmission by the unit sending the communication and wherein the predetermined number is entered as a reservation into the at least one memory of other units in the communication system.

7. The method of claim 6 wherein a predetermined number accompanies each message and wherein prior to sending the message the predetermined number is checked to determine whether or not it is in conflict with the reservations in the at least one memory, and wherein the predetermined number is pseudorandom and indicates how long the unit will wait prior to the next transmission, and the predetermined number is the units of delay that are counted beginning when the channel becomes available.

8. The method of claim 5 wherein a unit of delay approximates the time a communication unit takes to sense the presence of a transmission on the channel.

9. The method of claim 5 wherein the at least one memory comprises a reservation table.

10. The method of claim 5 wherein each unit operates autonomously with respect to transmissions.

11. The method of claim 5 wherein transmission after the first unit of delay is reserved for an emergency communication.

12. A system for wireless communication comprising a plurality of wireless stations; each station configured to receive and transmit communications on at least one channel, each station comprising at least one processor and at least one memory operatively connected to the at least one processor; the at least one processor being configured to sense communications on the at least one channel and to wait a predetermined number of units of delay before transmitting a communication on the channel; the predetermined number of units of delay being the delay a communication unit is scheduled to wait before transmitting its next communication; the plurality of wireless stations having the capability to reserve transmission times using numbers of units of delay determined by an algorithm; each packet comprising a flag that indicates whether or not the packet is being transmitted using a reserved time and when the packet is received the at least one processor checks the flag to determine if the flag indicates the packet was transmitted using a reserved time and checks the at least one memory to determine whether that the packet was received at the reserved time, and if not received at the reserved time, a hidden station is detected and the algorithm for determining the predetermined number of units of delay is modified to accommodate the hidden station.

13. The system of claim 12 wherein the at least one memory comprises a list of transmission delay times for each station having communications to transmit; and wherein the algorithm comprises a random number generator for determining transmission delay times; the range of the transmission delay times being a function of the number of actively transmitting stations based upon the probability of a collision Pc where $$Pc \leq 1 - \frac{R!}{(R-N)!R^N}$$

where N is the number of active transceivers and R is the range of the pseudorandom number generator.

14. The system of claim 12 wherein the at least one memory comprises a list of reservations specifying the units of delay a station will wait after clearance of the at least one channel, and wherein the at least one processor operates to avoid collisions by determining transmission times which are not in conflict with the reservation of another station.

15. The system of claim 14 wherein the at least one processor is configured to sense when a communication transmitted collides with a communication of another station and to retransmit after a predetermined number of units of delay.

16. The system of claim 15 wherein the predetermined number of units of delay is pseudorandom.

17. The system of claim 12 wherein the at least one processor is configured to detect periods when the at least one channel is idle and to transmit communications during idle periods after waiting a predetermined number of units of delay.

18. The system of claim 12 wherein the unit of delay is approximately the time required to sense the presence of a communication on the at least one channel.

19. The system of claim 12 wherein the wireless communication is radio and wherein each station comprises a transmitter for transmitting communications and a receiver for receiving communications or a transceiver for transmitting and receiving communications and wherein the system is a carrier sense multiple access communication system with collision avoidance.

20. A system for wireless communication comprising a plurality of wireless stations; each station configured to receive and transmit communications on at least one channel, each station comprising at least one processor and at least one memory operatively connected to the at least one processor; the at least one processor being configured to sense communications on the at least one channel and to wait a predetermined number of units of delay before transmitting a communication on the channel; the predetermined number of units of delay before transmission of the next communication being operatively associated with communications by the respective units; the communications being transmitted in packets and each packet carrying a flag to indicate if that particular packet is being transmitted at a previously reserved units of delay time; the at least one processor operating to check the flag to determine if the flag indicates the packet is transmitted using a prior reserved reservation and checks the at least one memory to confirm that that particular reservation was reserved by the particular station, and wherein if both conditions are not met, a hidden station is detected and the algorithm of selecting the predetermined number of units of delay is modified to accommodate the hidden station.

* * * * *